United States Patent
Zhou et al.

(10) Patent No.: US 10,673,358 B2
(45) Date of Patent: *Jun. 2, 2020

(54) ELECTRIC DRIVE SYSTEM AND ENERGY MANAGEMENT METHOD

(71) Applicant: General Electric Company, Schenectady, NY (US)

(72) Inventors: Jian Zhou, Shanghai (CN); Fei Xu, Shanghai (CN); Dong Liu, Shanghai (CN); Hai Qiu, Shanghai (CN); Pengju Kang, Yorktown Heights, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,348

(22) Filed: Jun. 6, 2019

(65) Prior Publication Data

US 2019/0288616 A1     Sep. 19, 2019

Related U.S. Application Data

(63) Continuation of application No. 15/453,218, filed on Mar. 8, 2017, now Pat. No. 10,374,529, which is a (Continued)

(30) Foreign Application Priority Data

Dec. 3, 2012 (CN) .......................... 2012 1 0509493

(51) Int. Cl.
*H02P 4/00* (2006.01)
*B60L 7/18* (2006.01)
(Continued)

(52) U.S. Cl.
CPC ................. *H02P 4/00* (2013.01); *B60L 7/18* (2013.01); *B60L 15/20* (2013.01); *B60L 15/209* (2013.01);
(Continued)

(58) Field of Classification Search
CPC .. H02P 4/00; B60L 50/30; B60L 50/64; B60L 7/18
(Continued)

(56) References Cited

U.S. PATENT DOCUMENTS 5,343,970 A * 9/1994 Severinsky ............ B60K 6/387
                                                                      180/65.25
5,549,172 A * 8/1996 Mutoh ..................... B60L 15/20
                                                                      180/65.1
(Continued)

FOREIGN PATENT DOCUMENTS

CN     101208855 A     6/2008
CN     101237154 A     8/2008
(Continued)

OTHER PUBLICATIONS

European Office Action issued in connection with corresponding EP Application No: 13195375.4 dated Jul. 5, 2019.
(Continued)

*Primary Examiner* — Kawing Chan
(74) *Attorney, Agent, or Firm* — Meagher Emanuel Laks Goldberg & Liao, LLP

(57) ABSTRACT

An electric drive system includes an energy storage system (ESS), a power conversion system, and an alternating current (AC) traction system. The ESS provides or receives electric power. The ESS includes a first energy storage unit and a second energy storage unit. The power conversion system is electrically coupled to the ESS for converting an input power to an output power. The AC traction system is electrically coupled to the power conversion system for converting the output power of the power conversion system to mechanical torques. The AC traction system includes a first AC drive device and a second AC drive device. An energy management system (EMS) is in electrical commu-
(Continued)

nication with the ESS, the AC traction system, and the power conversion system for providing control signals.

20 Claims, 10 Drawing Sheets

Related U.S. Application Data continuation of application No. 14/094,086, filed on Dec. 2, 2013, now Pat. No. 9,800,182.

(51) Int. Cl.
| | |
|---|---|
| *B60L 15/20* | (2006.01) |
| *B60L 50/40* | (2019.01) |
| *B60L 50/30* | (2019.01) |
| *B60L 50/51* | (2019.01) |
| *B60L 58/20* | (2019.01) |
| *B60L 50/64* | (2019.01) |
| *B60L 15/38* | (2006.01) |
| *H02J 7/02* | (2016.01) |
| *H02K 17/02* | (2006.01) |
| *H02J 7/34* | (2006.01) |

(52) U.S. Cl.
CPC ............ *B60L 15/2081* (2013.01); *B60L 15/38* (2013.01); *B60L 50/30* (2019.02); *B60L 50/40* (2019.02); *B60L 50/51* (2019.02); *B60L 50/64* (2019.02); *B60L 58/20* (2019.02); *H02J 7/022* (2013.01); *H02K 17/02* (2013.01); *B60L 2240/421* (2013.01); *B60L 2240/423* (2013.01); *H02J 7/345* (2013.01); *Y02T 10/645* (2013.01); *Y02T 10/7005* (2013.01); *Y02T 10/7022* (2013.01); *Y02T 10/7066* (2013.01); *Y02T 10/72* (2013.01); *Y02T 10/7275* (2013.01); *Y02T 90/16* (2013.01)

(58) Field of Classification Search
USPC .......................................................... 318/478
See application file for complete search history.

(56) References Cited

U.S. PATENT DOCUMENTS

| | | | |
|---|---|---|---|
| 6,118,237 A | 9/2000 | Kikuchi et al. | |
| 6,209,672 B1 | 4/2001 | Severinsky | |
| 6,271,648 B1 | 8/2001 | Miller | |
| 6,554,088 B2* | 4/2003 | Severinsky ............. | B60H 1/004 |
| | | | 180/65.23 |
| 6,583,599 B1 | 6/2003 | Phillips et al. | |
| 6,608,396 B2* | 8/2003 | Downer .............. | B60L 15/2045 |
| | | | 290/40 C |
| 6,691,809 B2 | 2/2004 | Hata et al. | |
| 7,063,637 B2 | 6/2006 | Yamauchi et al. | |
| 7,207,915 B2 | 4/2007 | Oshidari et al. | |
| 7,285,926 B2 | 10/2007 | McGarry et al. | |
| 7,583,053 B2 | 9/2009 | Kamohara | |
| 7,594,491 B2 | 9/2009 | Yanagida et al. | |
| 7,595,597 B2* | 9/2009 | King ....................... | B60K 6/28 |
| | | | 318/139 |
| 7,688,604 B2 | 3/2010 | Oyobe et al. | |
| 7,723,932 B2 | 5/2010 | King et al. | |
| 7,764,051 B2 | 7/2010 | Ishikawa | |
| 7,839,013 B2 | 11/2010 | Nakamura et al. | |
| 7,923,866 B2* | 4/2011 | Ichikawa .............. | B60W 10/26 |
| | | | 307/82 |
| 7,963,353 B2 | 6/2011 | Tatematsu et al. | |
| 7,965,510 B2* | 6/2011 | Suzuki ................... | B60K 6/365 |
| | | | 361/699 |
| 8,016,061 B2* | 9/2011 | Jeon ....................... | B60L 3/0046 |
| | | | 180/65.22 |
| 8,138,720 B2 | 3/2012 | Snyder et al. | |
| 8,387,730 B2 | 3/2013 | Bouchon | |
| 8,395,355 B2 | 3/2013 | Kaita et al. | |
| 8,415,909 B2 | 4/2013 | Ramamurthy et al. | |
| 8,469,849 B2 | 6/2013 | Kruger | |
| 8,535,200 B2 | 9/2013 | Vyas et al. | |
| 8,639,423 B2 | 1/2014 | Shaaf et al. | |
| 9,145,131 B2 | 9/2015 | Watanabe | |
| 9,561,719 B2 | 2/2017 | Lo et al. | |
| 10,374,529 B2* | 8/2019 | Zhou ....................... | B60L 15/20 |
| 2003/0150352 A1 | 8/2003 | Kumar | |
| 2004/0069548 A1 | 4/2004 | Kira et al. | |
| 2004/0263099 A1 | 12/2004 | Maslov et al. | |
| 2005/0082992 A1* | 4/2005 | Aizawa ................. | B60W 20/10 |
| | | | 318/66 |
| 2006/0169548 A1 | 8/2006 | Corbett et al. | |
| 2006/0250902 A1 | 11/2006 | Bender et al. | |
| 2007/0007939 A1 | 1/2007 | Miller et al. | |
| 2008/0197810 A1 | 8/2008 | Ishikawa et al. | |
| 2008/0218104 A1 | 9/2008 | Lukic et al. | |
| 2009/0115375 A1* | 5/2009 | Iida .......................... | B60L 58/20 |
| | | | 320/138 |
| 2009/0134820 A1* | 5/2009 | Sugiyama .............. | B60K 6/445 |
| | | | 318/66 |
| 2009/0224720 A1 | 9/2009 | Oyobe | |
| 2009/0242289 A1 | 10/2009 | Murty | |
| 2010/0019729 A1* | 1/2010 | Kaita ...................... | B60L 58/25 |
| | | | 320/134 |
| 2010/0019734 A1 | 1/2010 | Oyobe et al. | |
| 2010/0051367 A1 | 3/2010 | Yamada et al. | |
| 2010/0219777 A1* | 9/2010 | Slettevoll ................ | H02P 5/747 |
| | | | 318/8 |
| 2010/0219794 A1 | 9/2010 | Sugimoto et al. | |
| 2010/0222953 A1* | 9/2010 | Tang .................... | B60L 15/2036 |
| | | | 701/22 |
| 2010/0227722 A1 | 9/2010 | Conlon | |
| 2010/0240491 A1 | 9/2010 | Vyas et al. | |
| 2011/0057588 A1 | 3/2011 | Rineh | |
| 2011/0101915 A1 | 5/2011 | Mitsutani | |
| 2011/0111909 A1 | 5/2011 | Kim et al. | |
| 2012/0010041 A1 | 1/2012 | Soliman et al. | |
| 2012/0010771 A1 | 1/2012 | Kato et al. | |
| 2012/0091930 A1 | 4/2012 | Takahashi | |
| 2012/0103749 A1* | 5/2012 | Kimura ................. | B60W 30/20 |
| | | | 192/54.1 |
| 2012/0292985 A1 | 11/2012 | Sakai | |
| 2013/0041543 A1* | 2/2013 | Takayanagi ............ | B60K 6/445 |
| | | | 701/22 |
| 2014/0152225 A1* | 6/2014 | Zhou ........................ | H02P 4/00 |
| | | | 318/500 |
| 2017/0174098 A1* | 6/2017 | Zhou ........................ | H02P 4/00 |

FOREIGN PATENT DOCUMENTS

| | | |
|---|---|---|
| CN | 101524967 A | 9/2009 |
| CN | 101844511 A | 9/2010 |
| DE | 102007056722 A | 7/2008 |
| DE | 102009023340 A1 | 2/2011 |
| DE | 102010044497 A | 3/2012 |
| EP | 2117106 A1 | 11/2009 |
| EP | 2439120 A1 | 4/2012 |
| JP | 200023313 | 1/2000 |
| JP | 2000013922 A | 1/2000 |
| JP | 2002067723 A | 3/2002 |
| JP | 2002078106 A | 3/2002 |
| JP | 2002078110 A | 3/2002 |
| JP | 2003333707 A | 11/2003 |
| JP | 2004-260904 A | 9/2004 |
| JP | 2005297729 A | 10/2005 |
| JP | 2006042510 A | 2/2006 |
| JP | 2006280170 A | 10/2006 |
| JP | 2007143374 A | 6/2007 |
| JP | 2007-325474 A | 12/2007 |
| JP | 2008-312382 A | 12/2008 |
| JP | 2009-508763 A | 3/2009 |
| JP | 2010130828 A | 6/2010 |
| JP | 2010-206971 A | 9/2010 |
| JP | 2000295711 A | 10/2010 |
| JP | 2013-203109 A | 10/2013 |

(56) References Cited

FOREIGN PATENT DOCUMENTS

| | | |
|---|---|---|
| JP | 2013-207831 A | 10/2013 |
| KR | 20110074370 A | 6/2011 |
| WO | 2011001251 A2 | 1/2011 |

OTHER PUBLICATIONS

Northcott et al., "Electromagnetic Transient Simulation of Hybrid Electric Vehicles", Industrial Electronics, 2007. ISIE 2007. IEEE International Symposium on, pp. 833-838, Jun. 4-7, 2007.

Napoli et al., "Multiple-Input DC-DC Power Converter for Power-Flow Management in Hybrid Vehicles", Conference Record of the IEEE Industry Applications Conference. IAS Annual Meeting, Pittsburgh, Pennsylvania, USA, vol. No. 3, pp. 1578-1585, Oct. 13, 2002.

Unofficial English Translation of Chinese Office Action issued in connection with corresponding CN Application No. 201210509493.2 dated Jul. 13, 2015.

European Search Report and Opinion issued in connection with corresponding EP Application No. 13195375.4 dated Dec. 21, 2015.

Unofficial English Translation of Chinese Office Action issued in connection with corresponding CN Application No. 201210509493.2 dated Mar. 11, 2016.

Toyota Prius, "Plug-in Hybrid Gasoline-Electric Hybrid Synergy Drive", Hybrid Vehicle Dismantling Manual, 74 pages, 2011.

PCED enUSA 2010 Fusion Milan Hybrid, Description and Operation, pp. 1-121, 2009.

Hybrid/Battery Control: Hybrid Control System: Details (2010 Prius PHV), Sep. 23, 2011, https://techinfo.toyota.com/ t3Portal/resources/jsp/siviewer/index.jsp?dir=ncf/NM14C0U&href=xtml/RM000004273004X.html&locale=en&model=Prius%20PH, pp. 1-65.

Hybrid/Battery Control: Plug-In Charge Control System: Details; 2012 MY Prius PHV [Jan. 2012- ] https://techinfo.toyota.com/t3Portal/resources/jsp/siviewer/index.jsp?dir=ncf/NM19G0U&href=xtml/RM000005417000X.html&locale=en&model=Prius%20PH, pp. 1-9.

English Translation of Japanese Office Action issued in connection with corresponding JP Application No. 2018-089123 dated Mar. 20, 2019.

Unofficial English Translation of Japanese Office Action issued in connection with corresponding JP Application No. 2013-246847 dated Sep. 5, 2017.

Notification of Reasons for Refusal for corresponding JP Application No. 2019-069591 dated Jan. 14, 2020.

\* cited by examiner

ELECTRIC DRIVE SYSTEM AND ENERGY MANAGEMENT METHOD

BACKGROUND

Embodiments of the disclosure relate generally to electric drive systems and energy management methods, useful in a variety of propulsion systems such as an electric vehicle (EV) system.

With the increased concern about energy crisis and environmental pollution caused by the fossil fuel exhaust, there is a growing interest in developing electric-powered vehicles, in which conventional fossil energy may be replaced by energy sources such as lead-acid batteries, fuel cells, flywheel batteries, etc. Electric drive system is one of the key components in the electric-powered vehicles. In the electric drive system, several kinds of AC motors such as induction motor (IM), interior permanent motor (IPM) and switched reluctance motor (SRC) are widely used for converting electric power into mechanical torques. It is desired that the propulsion system may have features of high efficiency, and high performance with low cost. These features may be achieved by choosing appropriate energy sources, appropriate AC motors, and then combining them together in an appropriate structure.

Currently, most of the electric drive systems include a single energy storage system (ESS) or a single motor, or a dual ESS with a single motor. However, on the one hand, a single ESS may not satisfy both the energy and power requirements such as low energy, slow charging rate, and a shorter life due to its own limitation of charge/discharge characteristics. On the other hand, a single motor may not work with a high efficiency across the entire operating range. It will cause problems of oversize, high cost, and low efficiency in order to meet high performances such as a short acceleration time and a long running mileage of the propulsion system.

Therefore, it is desirable to provide systems and methods to address the above-mentioned problems.

BRIEF DESCRIPTION

In accordance with one embodiment disclosed herein, an electric drive system is provided. The electric drive system includes an energy storage system (ESS), a power conversion system, an AC traction system, and an energy management system (EMS). The ESS includes a first energy storage unit for providing or receiving a first power and a second energy storage unit for providing or receiving a second power. The power conversion system is electrically coupled to the ESS for converting an input power to an output power. The power conversion system includes a power conversion device. The power conversion device includes a first terminal coupled to the first energy storage unit, a second terminal coupled to the second energy storage unit, a third terminal, and a fourth terminal. The AC traction system is electrically coupled to the power conversion system for converting the output power of the power conversion system to mechanical torques. The AC traction system includes a first AC drive device and a second AC drive device. The first AC drive device is coupled to the third terminal of the power conversion device for providing or receiving a first mechanical torque. The second AC drive device is coupled to the fourth terminal of the power conversion device for providing or receiving a second mechanical torque. The EMS is in communication with the ESS, the AC traction system, and the power conversion system for providing control signals.

In accordance with another embodiment disclosed herein, an energy management method is provided. The energy management method includes enabling at least one of the first AC drive device and the second AC drive device based at least in part on an electric drive system speed signal. The energy management method includes enabling at least one of a first energy storage unit and a second energy storage unit. The energy management method includes sending power control signals to the power conversion system for controlling power flow paths in the electric drive system. The controlling of the power flow paths includes receiving or providing an input power by at least one of a first terminal and a second terminal of the power conversion system and providing or receiving an output power by at least one of a third terminal and a fourth terminal of the power conversion system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

As used herein, the terms "may," "can," "may be," and "can be" indicate a possibility of an occurrence within a set of circumstances; a possession of a specified property, characteristic or function; and/or qualify another verb by expressing one or more of an ability, capability, or possibility associated with the qualified verb. Accordingly, usage of "may," "can," "may be," and "can be" indicate that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity may not occur. This distinction is captured by the terms "may," "can," "may be," and "can be".

Figure 1:
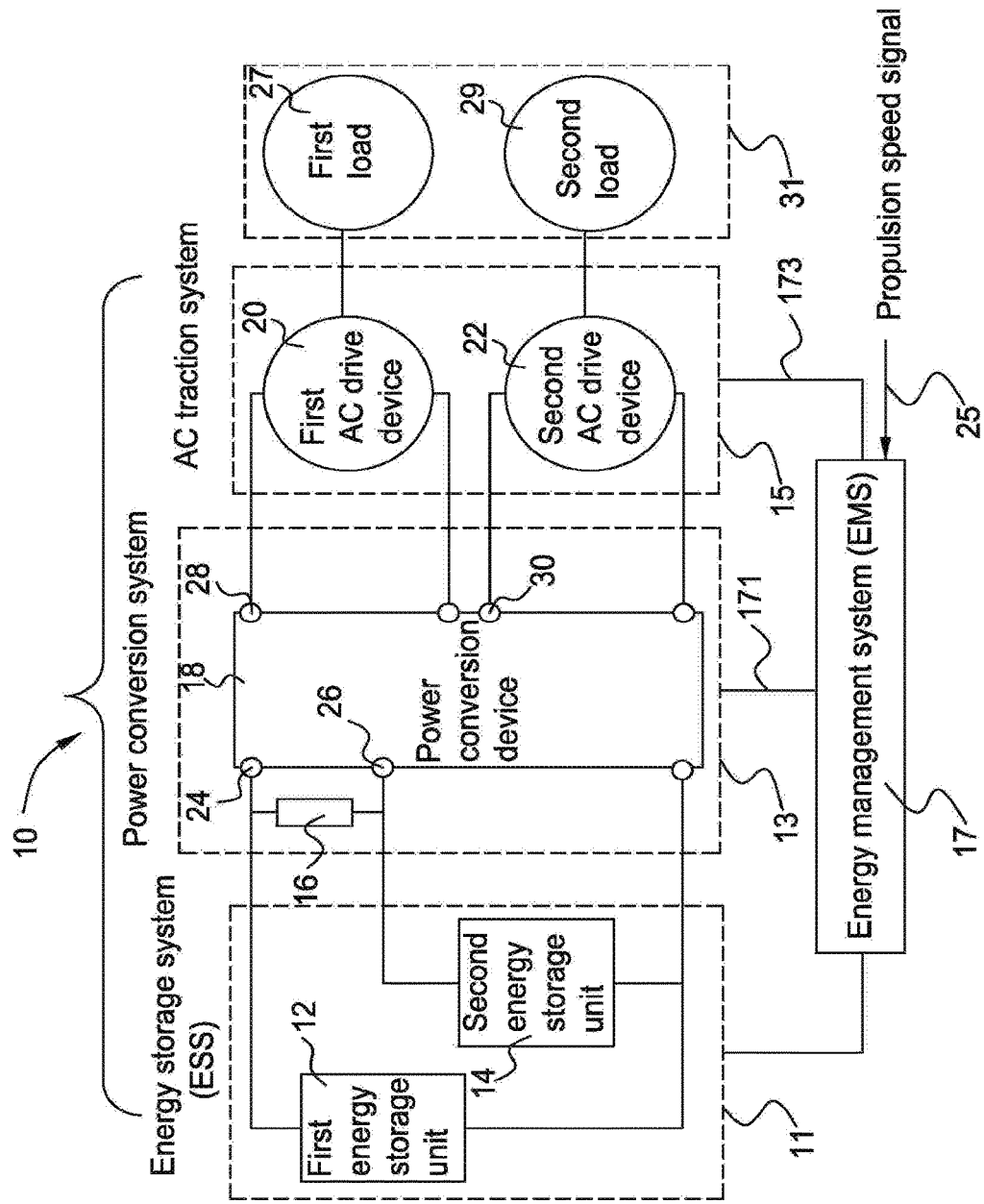
FIG. 1 is a block diagram of an electric drive system applied in a propulsion system for driving two loads in accordance with an exemplary embodiment of the present disclosure.

FIG. 1 illustrates a block diagram of an electric drive system 10 applied in a propulsion system (not shown) for driving two loads in accordance with an exemplary embodiment of the present disclosure. The propulsion system may include a forklift system and a crane system, for example. The electric drive system 10 includes an ESS 11, a power conversion system 13, an AC traction system 15, and an energy management system (EMS) 17. In some embodiments, the power conversion system 13 is configured for converting a DC power generated from the ESS 11 into another DC power provided to the AC traction system 15. In some embodiments, the power conversion system 13 is configured for converting a DC power generated from the AC traction system 15 into another DC power for charging the ESS 11.

The EMS 17 is arranged to be in electrical communication with the ESS 11, the power conversion system 13, and the AC drive system 15. In some embodiments, the EMS 17 may be configured to send power control signals 171 to enable the power conversion system 13 to provide necessary DC power for the AC traction system 15. In some embodiments, the EMS 17 may be configured to send power control signals 171 to enable the power conversion system 18 to provide necessary DC power for charging the ESS 11. In some embodiments, the EMS 17 may be configured to send torque control signals 173 to the AC traction system 15 according to one or more command signals (e.g., electric drive system speed signal 25) to enable the AC traction system 15 to provide necessary mechanical torques to the load system 31.

In some embodiments, the ESS 11 includes a first energy storage unit 12 for providing or receiving a first power and a second energy storage unit 14 for providing or receiving a second power. In some embodiments, the ESS 11 may include more than two energy storage units. In some embodiments, the AC traction system 15 includes a first AC drive device 20 for providing or receiving a first mechanical torque and a second AC drive device 22 for providing or receiving a second mechanical torque. In some embodiments, the AC traction system 15 may include more than two AC drive devices.

The power conversion system 13 includes a power conversion device 18. The power conversion device 18 includes a first terminal 24 electrically coupled to the first energy storage unit 12, a second terminal 26 electrically coupled to the second energy storage unit 14, a third terminal 28 electrically coupled to the first AC drive device 20, and a fourth terminal 30 electrically coupled to the second AC drive device 22. In some embodiments, the power conversion device 18 may include more than four terminals.

When the electric drive system 10 is operated in an electric driven mode, in some embodiments, the first terminal 24 may be configured to receive a first input power from the first energy storage unit 12, and the second terminal 26 may be configured to receive a second input power from the second energy storage unit 14. In some embodiments, the power conversion device 18 is configured to perform power conversion with respect to the received first input power and second input power, provide a first output power at the third terminal 28, and provide a second output power at the fourth terminal 30. The first output power may be provided to the first AC drive device 20, and the second output power may be provided to the second AC drive device 22.

When the electric drive system 10 is operated in a regenerative or braking mode, in some embodiments, the third terminal 28 may be configured to receive a first input power from the first AC drive device 20, and the fourth terminal 30 may be configured to receive a second input power from the second AC drive device 22. In some embodiments, the power conversion device 18 is configured to perform power conversion with respect to the received first input power and the second input power, provide first output power at the first terminal 24 for charging the ESS 11 (e.g., first energy storage unit 12), and provide second output power at the second terminal 26 for charging the ESS 11 (e.g., second energy storage unit 14).

The power conversion system 13 may include a pre-charging switching device 16 electrically coupled between the first energy storage unit 12 and the second energy storage unit 14 for selectively providing a power flow path between the first energy storage unit 12 and the second energy storage unit 14. In some embodiments, the power flow path may be unidirectional, so that the first energy storage unit 12 may deliver electric power through the unidirectional power flow path for charging the second energy storage unit 14. In some embodiments, the power flow path may be bi-directional, so that the electric power can be delivered between the first energy storage unit 12 and the second energy storage unit 14 through the bi-directional power flow path.

A load system 31 may include a first load 27 coupled to the first AC drive device 20 and a second load 29 coupled to the second AC drive device 22. In some embodiments, the first load 27 and the second load 29 may receive a first mechanical torque from the first AC drive device 20 and a second mechanical torque from the second AC drive device 22 respectively. In some embodiments, when the electric drive system 10 is operated in the regenerative or braking mode, the first load 27 and the second load 29 may provide a first mechanical torque and a second mechanical torque to the first AC drive device 20 and the second AC drive device 22 respectively. Then the first and second mechanical torques may be converted by the first and second AC drive devices 20, 22, respectively, into electric power for charging the ESS 11.

With a combination of at least two energy storage units, at least one power providing or receiving action may be taken in an appropriate manner to improve the power utilization and extend the life of ESS. With a combination of at least two AC drive devices, at least one power conversion action may be taken in a flexible manner to improve the efficiency of the electric drive system.

Figure 2:
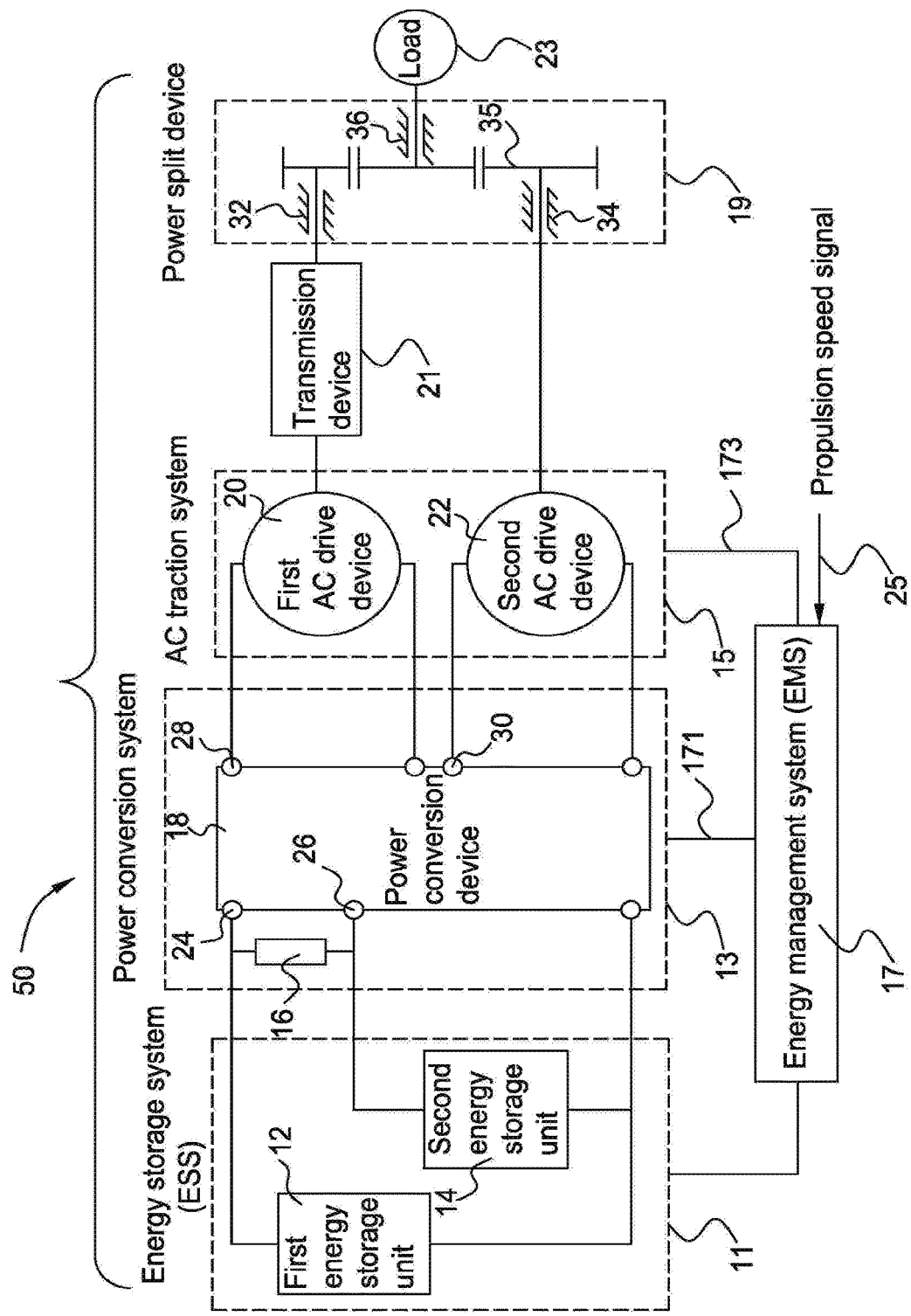
FIG. 2 is a block diagram of an electric drive system applied in a propulsion system for driving a single load in accordance with an exemplary embodiment of the present disclosure.

FIG. 2 illustrates a block diagram of an electric drive system 50 applied in a propulsion system (not shown) for driving a single load 23 in accordance with an exemplary embodiment of the present disclosure. The propulsion system may include an EV system and an elevator system. The electric drive system 50 is similar to the electric drive system 10 shown in FIG. 1 and includes the ESS 11, the power conversion system 13, the AC traction system 15, and the EMS 17. Thus, detail description about the ESS 11, the power conversion system 13, the AC traction system 15, and the EMS 17 are omitted herein. In some embodiments, the electric drive system 50 includes a power split device 19 mechanically coupled between the AC traction system 15 and the load 23.

The power split device 19 includes a first mechanical terminal 32, a second mechanical terminal 34, and a third mechanical terminal 36. The first mechanical terminal 32 is mechanically coupled to the first AC drive device 20 for receiving or providing a first mechanical torque. The second mechanical terminal 34 is mechanically coupled to the second AC drive device 22 for receiving or providing a second mechanical torque. The third mechanical terminal 36 is mechanically coupled to the load 23 for providing or receiving a third mechanical torque. In some embodiments, the power split device 19 includes one or more gears 35 for transmitting mechanical torques provided by the AC traction system 15 to the load 23.

In some embodiments, when the propulsion system is driving a heavy load, the first mechanical terminal 32 receives a first mechanical torque from the first AC drive device 20, the second mechanical terminal 34 receives a second mechanical torque from the second AC drive device 22, and the third mechanical terminal 36 provides a third mechanical torque to the load 23. The third mechanical torque is a combination of the first mechanical torque and the second mechanical torque by the power split device 19.

In some embodiments, when the propulsion system is operated in a regenerative or braking mode, the third mechanical terminal 36 receives a third mechanical torque from the load 23, the first mechanical terminal 32 provides a first mechanical torque to the first AC drive device 20, and the second mechanical terminal 34 provides a second mechanical torque to the second AC drive device 22. The first mechanical torque and the second mechanical torque are split from the third mechanical torque by the power split device 19. Then the first mechanical torque and the second mechanical torque may be converted into electric power by the AC traction system 15 for charging the ESS 11.

In some embodiments, when the propulsion system is driving a light load, the first mechanical terminal 32 receives a first mechanical torque from the first AC drive device 20, the second mechanical terminal 34 provides a second mechanical torque to the second AC drive device 22, and the third mechanical terminal 36 provides a third mechanical torque to the load 23. The second mechanical torque and the third mechanical torque are split from the first mechanical torque by the power split device 19. Then the second mechanical torque may be converted into electric power by the second AC drive device 22 for charging the ESS 11.

In some embodiments, the electric drive system 50 may include an optional transmission device 21. The transmission device 21 may be mechanically coupled between the AC traction system 15 and the power split device 19 for matching the output speed of the AC traction system 15 with the electric drive system speed.

In some embodiments, the transmission device 21 may be mechanically coupled between the first AC drive device 20 and the first mechanical terminal 32 of the power split device 19. In some embodiments, the transmission device 21 may be mechanically coupled between the second AC drive device 22 and the second mechanical terminal 34 of the power split device 19. In some embodiments, the transmission device 21 may be eliminated when the output speed of the AC traction system 15 meets requirements of the propulsion system.

The weight, size, and cost of the electric drive system may be decreased by selecting appropriate energy storage units, appropriate AC drive devices, and an appropriate combination of the energy storage units and the AC drive devices.

In some embodiments, the ESS 11 may include a battery and another battery used as the first energy storage unit 12 and the second energy storage unit 14, respectively. In some embodiments, the ESS 11 may include a battery and an ultra-capacitor used as the first energy storage unit 12 and the second energy storage unit 14, respectively. In some embodiments, the ESS 11 may include other kinds of energy source such as a flywheel battery.

In some embodiments, the AC traction system 15 may include an induction motor (IM) and another IM used as the first AC drive device 20 and the second AC drive device 22, respectively. In some embodiments, the AC traction system 15 may include an IM and an interior permanent motor (IPM) used as the first AC drive device 20 and the second AC drive device 22, respectively. In some embodiments, the AC traction system 15 may include other kinds of AC motor.

Figure 3:
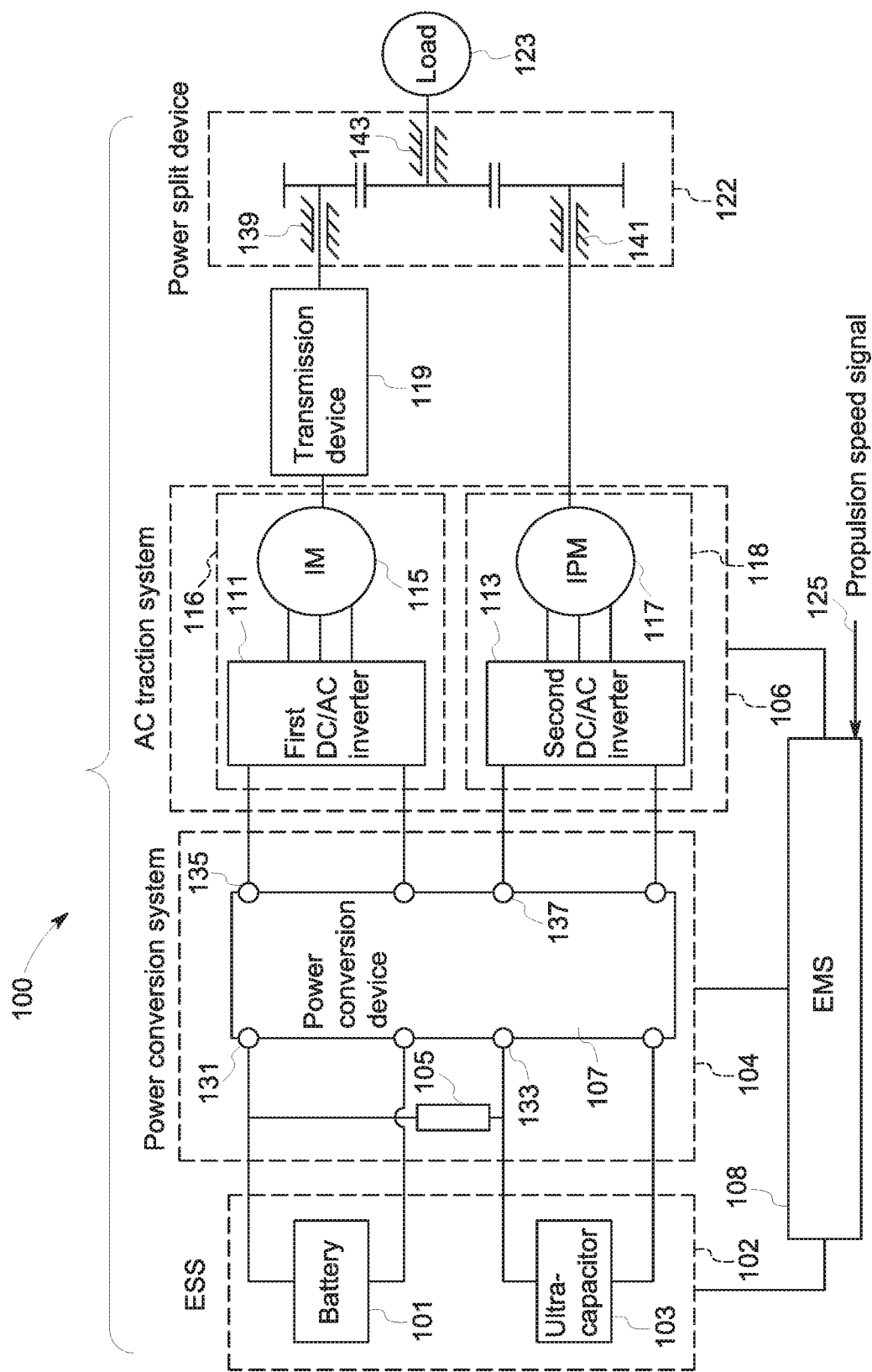
FIG. 3 is a diagram of an electric drive system applied in an electric vehicle (EV) system in accordance with an exemplary embodiment of the present disclosure.

FIG. 3 illustrates a diagram of an electric drive system 100 applied in an EV system (not shown) in accordance with an exemplary embodiment of the present disclosure. The electric drive system 100 includes an ESS 102, a power conversion system 104, an AC traction system 106, an EMS 108, a power split device 122, and a transmission device 119.

In some embodiments, the ESS 102 includes a battery 101 and an ultra-capacitor 103. The AC traction system 106 includes a first AC drive device 116 and a second AC drive device 118. The first AC drive device 116 includes a first DC/AC inverter 111 and an IM 115. The second AC drive device 118 includes a second DC/AC inverter 113 and an IPM 117. In some embodiments, a single power conversion device 107 is used which has been described in detail in the power conversion device 18 shown in FIG. 1.

Several power flow paths may be formed in the electric drive system 100. In some embodiments, the battery 101 may be enabled to deliver electric power through the power conversion system 104, which in turn provides converted electric power to at least one of the IM 115 and the IPM 117, thereby at least a first power flow path is formed. In some embodiments, the ultra-capacitor 103 may be enabled to deliver electric power through the power conversion system 104, which in turn provides converted electric power to at least one of the IM 115 and the IPM 117, thereby at least a second power flow path is formed.

In some embodiments, the mechanical torques of at least one of the IM 115 and the IPM 117 firstly are converted into electric power and then the electric power may be delivered through the power conversion system 104 for charging at least one of the battery 101 and the ultra-capacitor 103, thereby at least a third power flow path is formed. In some embodiments, the battery 101 may deliver electric power through the pre-charging switching device 105 for charging the ultra-capacitor 103, thereby at least a fourth power path is formed.

A flexible charging strategy can be implemented to charge at least one of the battery 101 and the ultra-capacitor 103. For example, in some embodiments, the ultra-capacitor 103 can be charged with electric power generated from the IM 115 and converted by the single power conversion device 107. This is different from the prior charging strategy that charging the ultra-capacitor 103 through the use of pre-charging switching device 105. In some embodiments, the EMS 108 may be configured to implement a decoupling algorithm for controlling the IM 115 and the IPM 117 separately.

Figure 4:
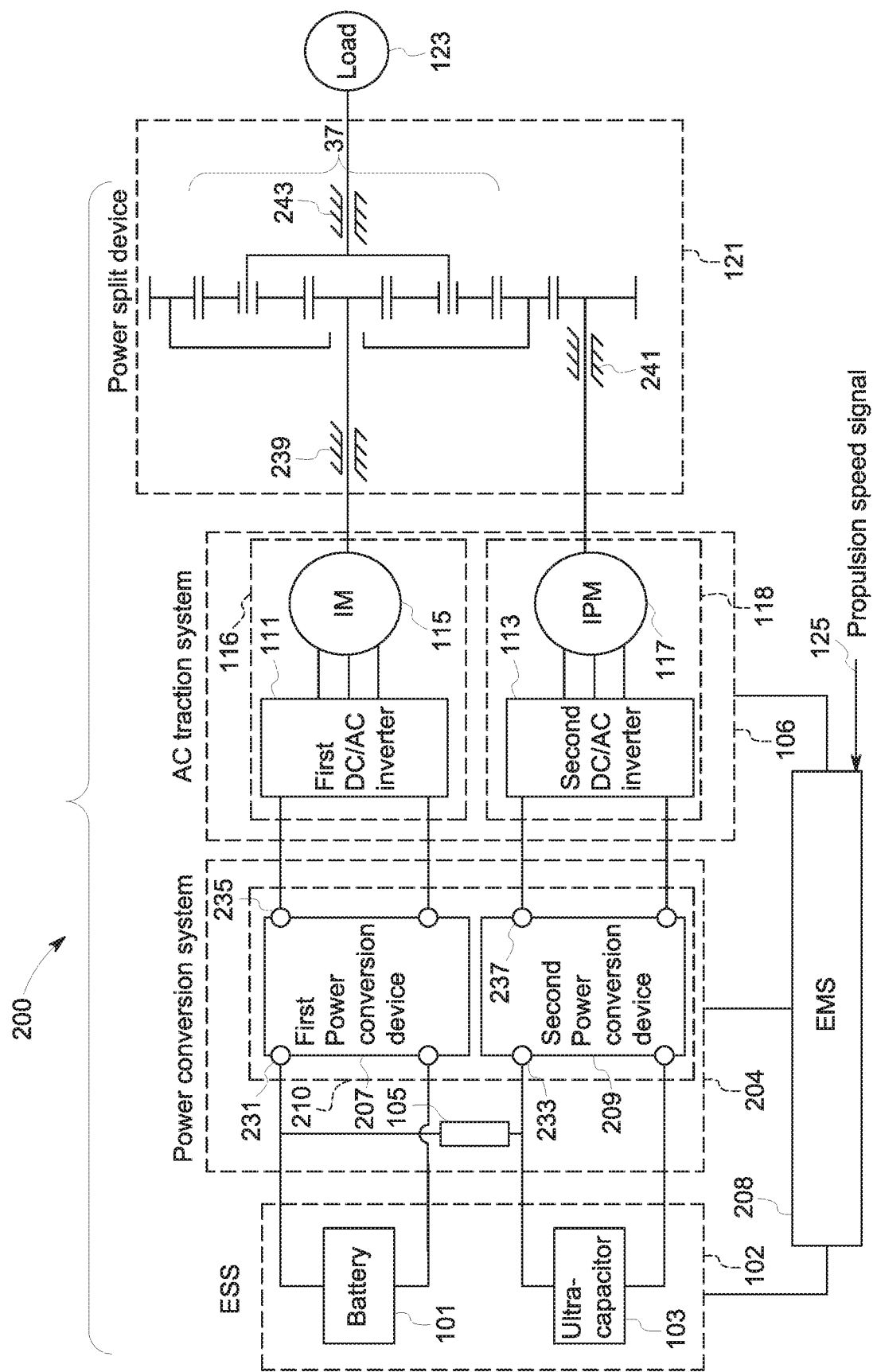
FIG. 4 is a diagram of an electric drive system with two separate power conversion devices coupled in parallel applied in an EV system in accordance with an exemplary embodiment of the present disclosure.

FIG. 4 illustrates a diagram of an electric drive system 200 with a first power conversion device 207 and a second power conversion device 209 coupled in parallel applied in an EV system (not shown) in accordance with an exemplary embodiment of the present disclosure. In some embodiments, the power split device 121 may include one or more planetary sets 37 for transmitting mechanical torques provided by the AC traction system 106 to the load 123.

In some embodiments, the first power conversion device 207 includes a first terminal 231 and a third terminal 235. The second power conversion device 209 includes a second terminal 233 and a fourth terminal 237.

In some embodiments, electric power from IM 115 may be delivered to the ultra-capacitor 103 through the power conversion system 204 indirectly via the pre-charging switching device 105, and electric power from the IPM 117 may be delivered to the ultra-capacitor 103 through the power conversion system 204.

A decoupling control of the two AC motors 115, 117 may be managed by controlling the first power conversion device 207 and the second power conversion device 209 separately due to different output DC voltages at the third terminal 235 and the fourth terminal 237.

Several charging paths may be implemented for charging the ultra-capacitor 103. In some embodiments, the battery 101 may deliver electric power through the pre-charging switching device 105 for charging the ultra-capacitor 103. In some embodiments, the IM 115 may deliver electric power through the first power conversion device 207 and the pre-charging switching device 105 for charging the ultra-capacitor 103. In some embodiments, the IPM 117 may deliver electric power through the second power conversion device 209 for charging the ultra-capacitor 103. In some embodiments, at least a part of the mechanical torque provided from the IM 115 can be converted into electric power through the IPM 117 and the second power conversion device 209, so that the ultra-capacitor 103 can be charged.

Figure 5:
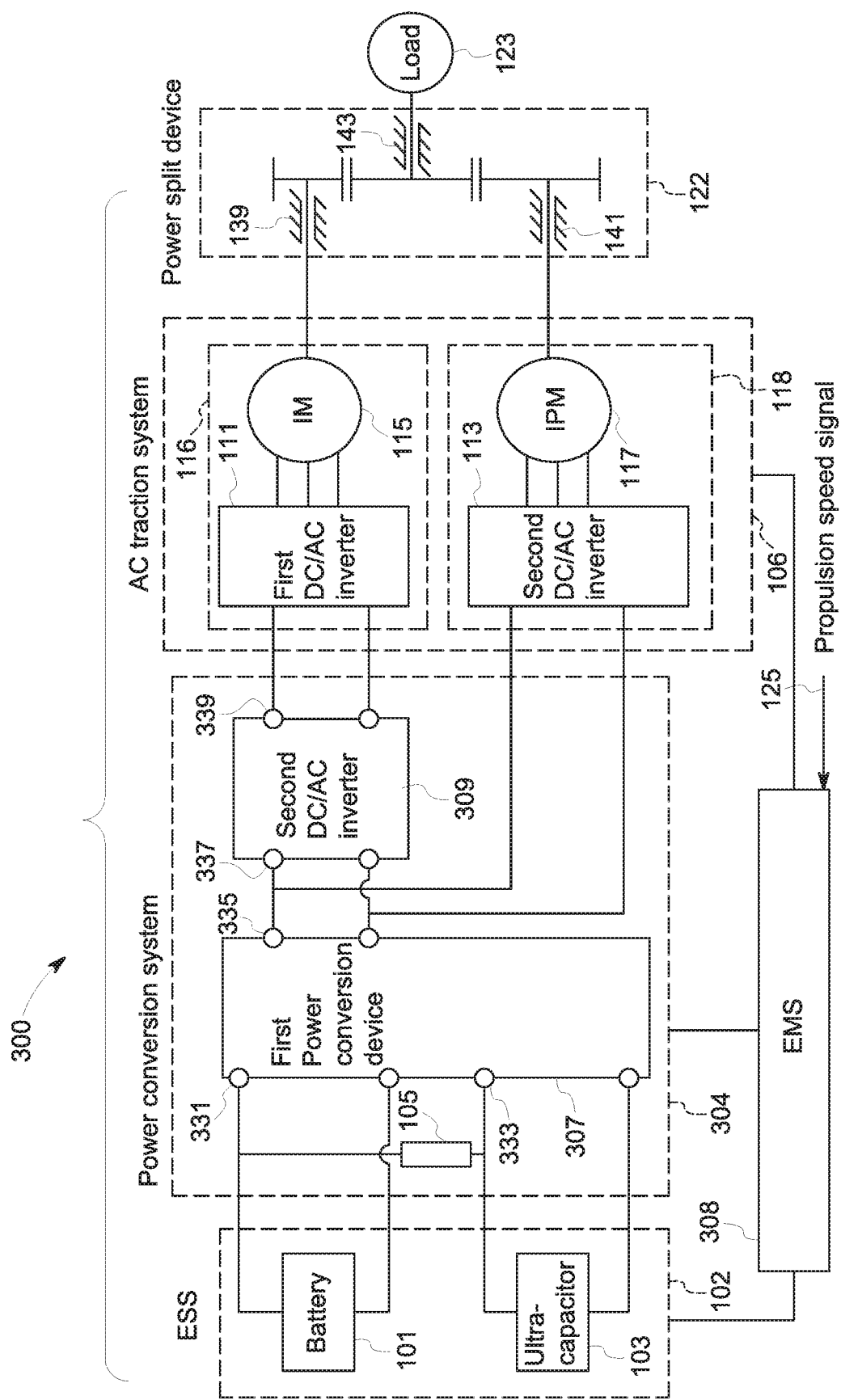
FIG. 5 is a diagram of an electric drive system with two separate power conversion devices coupled in series applied in an EV system in accordance with an exemplary embodiment of the present disclosure.

FIG. 5 illustrates a diagram of an electric drive system 300 with a first power conversion device 307 and a second power conversion device 309 coupled in series applied in an EV system (not shown) in accordance with an exemplary embodiment of the present disclosure.

The first power conversion device 307 includes a first terminal 331, a second terminal 333, and a third terminal 335. In some embodiments, the third terminal 335 is electrically coupled to the second AC drive device 118 and the second power conversion device 309. The second power conversion device 309 includes an input terminal 337 electrically coupled to the third terminal 335 of the first power conversion device 307, and an output terminal 339 electrically coupled to the first AC drive device 116. In some embodiments, the power flow paths may also be implemented in a flexible manner similar to what has been described with reference to FIG. 3.

A decoupling control of the IM 115 and the IPM 117 may be achieved by controlling the first power conversion device 307 and the second power conversion device 309 separately due to different output DC voltages at the third terminal 335 and the output terminal 339.

In some embodiments, the second power conversion device 309 is coupled to the second AC drive device 118. In some embodiments, the power conversion system 304 may include more separate power conversion devices and a flexible manner in connecting these separate power conversion devices.

Figure 6:
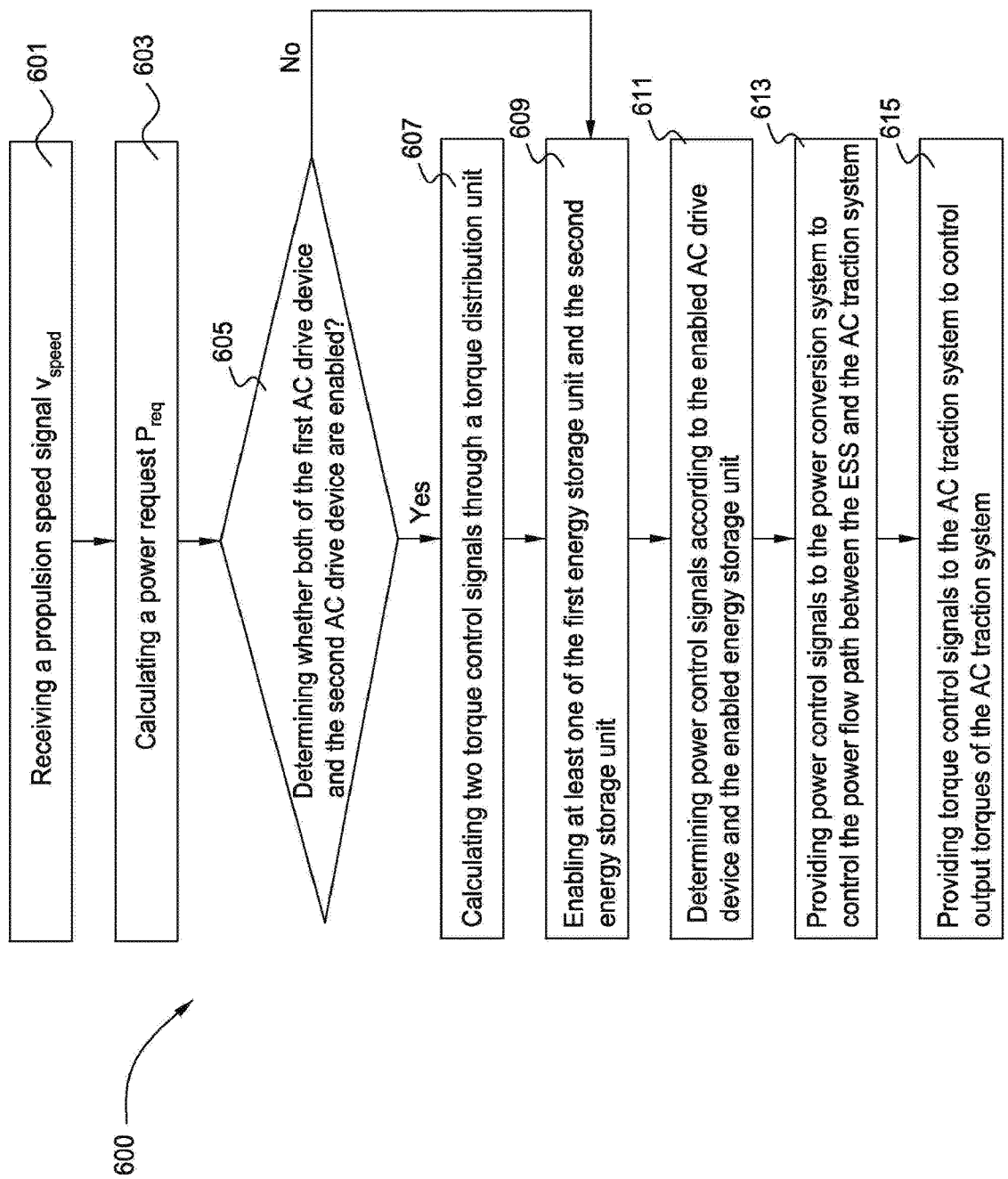
FIG. 6 is a flowchart of an energy management method for controlling power flow in an electric drive system in accordance with an exemplary embodiment of the present disclosure.

FIG. 6 illustrates a flowchart of an energy management method 600 for controlling power flow in an electric drive system in accordance with an exemplary embodiment. At least some blocks of the method 600 may be programmed with software instructions stored in a computer-readable storage medium which, when executed by a processor, perform various steps of the method 600. The computer-readable storage medium may include volatile and nonvolatile, removable and non-removable media implemented in any method or technology. The computer-readable storage medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which may be used to store the desired information and which may be accessed by an instruction execution system.

In some embodiments, the method 600 may start at block 601, when a measured electric drive system speed $V_{speed}$ is received. Then the process goes to block 603, in some embodiments, a required power $P_{req}$ is calculated by a total torque request signal $T_{total}$ and $V_{speed}$. Then the process goes to block 605.

At block 605, a determination is made to enable at least one of the first AC drive device 20 and the second AC drive device 22 based at least in part on $V_{speed}$. In some embodiments, the propulsion system may be operated in a normal mode based at least in part on $V_{speed}$. The normal mode may include a starting mode, an accelerating or uphill mode, a cruising mode, and a regenerative or braking mode. In some embodiments, the propulsion system may be operated in a fault-tolerate mode according to measured current signals or voltage signals.

In some embodiments, the operating AC drive device and an operating manner (e.g., motor, generator) of the AC motor in the AC drive device are determined based at least in part on the operating mode and $P_{req}$. If both of the first AC drive device 20 and the second AC drive device 22 are enabled, the process goes to 607, if not, the process goes to 609.

At block 607, several optimization algorithms may be implemented in a torque distribution unit for distributing the total torque request signal $T_{total}$ into a first torque command signal and a second torque command signal. The first torque command signal is provided to the first AC drive device 20 and the second torque command signal is provided to the second AC drive device 22. Then the process goes to block 609.

At block 609, a determination is made to enable at least one of the first energy storage unit 12 and the second energy storage unit 14 based at least in part on the operating AC drive device and the structure of the power conversion system. In some embodiments, the operating manner (e.g., charger, discharger) of the first and second energy storage units is determined.

In some embodiments, a principle for determining the operating energy storage unit is that the first energy storage unit 12 is operated as a primary power supplier, the second energy storage unit 14 is operated as an assistant. In some embodiments, the first energy storage unit 12 provides power to the first AC drive device 20 and the second energy storage unit 14 provides power to the second AC drive device 22.

In some embodiments, the second energy storage unit 14 provides an additional power when $P_{req}$ rapidly that the first energy storage unit 12 alone may fail to provide the required power $P_{req}$ due to a limitation of its charge/discharge characteristic. In some embodiments, when the second energy storage unit 14 fails to provide the additional power, the first energy storage unit 12 can be relied on to provide the needed power.

In some embodiments, the power provided by the first AC drive device 20 and the second AC drive device 22 may be partly used to charge the second energy storage unit 14 when the propulsion system is operated in a regenerative or braking mode. Then the process goes to block 611.

At block 611, power control signals 171 based at least in part on the enabled AC drive device and the enabled energy storage unit is determined for controlling power converting process. The power control signals 171 may be obtained by the description below.

The electric power may be generated from the ESS 11 and provided to the AC traction system 15. In some embodiments, a first input power received by the first terminal 24 may be converted into a first output power at the third terminal 28 and a second output power at the fourth terminal 30.

In some embodiments, a second input power received by the second terminal 26 may be converted into another first output power at the third terminal 28 and another second output power at the fourth terminal 30.

In some embodiments, a first input power received by the first terminal 24 and a second input power received by the second terminal 26 are converted into another first output power at the third terminal 28 and another second power at the fourth terminal 30.

Then electric power received by the third terminal 28 and the fourth terminal 30 are selectively provided to the AC traction system 15 based on the operating AC drive device.

The electric power may be generated from the AC traction system 15 and be used to charge the ESS 11. In some embodiments, when the first AC motor in the first AC drive device 20 is operated as a generator, the electric power generated from the first AC drive device 20 may be used to charge the ESS 11. The electric power can be delivered to the second energy storage unit 14 through the power conversion device 18 directly or through the pre-charging device 16 via the power conversion device 18 indirectly.

In some embodiments, when the second AC motor in the second AC drive device 22 is operated as a generator, the electric power generated from the second AC drive device 22 may be delivered to the ESS 11 through the power conversion device 18 directly.

In some embodiments, when the first AC motor in the first AC drive device 20 is enabled as a motor and the second AC motor in the second AC drive device 22 is enabled as a generator, the mechanical torque from the first AC drive device 20 may be split by the power split device 19 into a first mechanical torque and a second mechanical torque. The first mechanical torque is supplied to the load 23, and the second mechanical torque is converted to an electric power for charging the second storage unit 14 through the power conversion device 18.

In some embodiments, the power generated from the first energy storage unit 12 may be delivered to the second energy storage unit 14 through the pre-charging switching device 16. Then the process goes to block 613. At block 613, the power control signals 171 is used to control the power flow among the energy storage system 11, the power conversion system 13 and the AC traction system 15. Then the process goes to block 615, torque control signals 173 are provided to the AC traction system 15 for outputting desired torques for driving the load 23.

The process described above may be modified in a variety of ways. In some embodiment, an additional block may be included before block 601, at the additional block, a determination is made to ascertain whether a pre-charging process should be enabled according to a current, a voltage or a power $P_{esu2}$ of the second storage unit 14. In some embodiments, when $P_{esu2} < P_2$ (where $P_2$ is a predetermined value which represents a threshold that the second energy storage unit needs to be charged), the pre-charging process is enabled. Otherwise, the pre-charging process is disabled.

In some embodiments, the pre-charging process function is initiated before the propulsion system is enabled. The pre-charging process includes charging the second energy storage unit 14 from the first energy storage unit 12 through the pre-charging switching device 16 which may ensure that the second energy storage unit 14 can provide enough power quickly when needed. Then the process goes to block 601.

Figure 7:
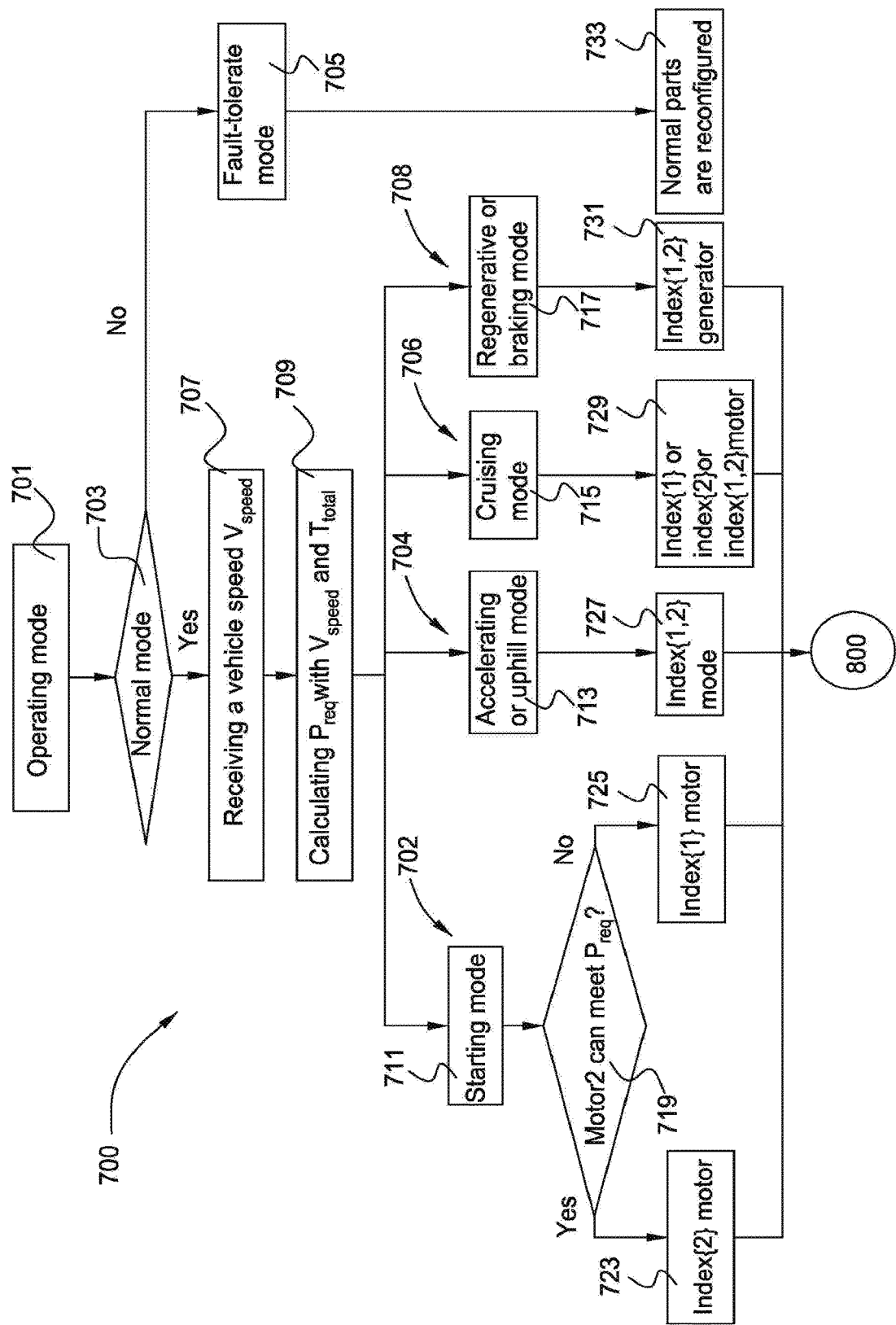
FIG. 7 is a flowchart of determining whether both of the first AC drive device and the second AC drive device are enabled shown in FIG. 6 in accordance with an exemplary embodiment of the present disclosure.

FIG. 7 illustrates a flowchart of determining whether both of the first AC drive derive and the second AC drive device are enabled shown in FIG. 6 in an EV system in accordance with an exemplary embodiment of the present disclosure. The detailed illustration is based on the structure shown in FIG. 3. However, a person having ordinary skills in the art may apply the method disclosed herein to other propulsion systems.

In some embodiments, the flowchart 700 may start at block 701, if the EV system fails, at least one of the measured current signals or the voltage signals exceeds predetermined value, the EV system is operated in a fault-tolerate mode as shown at block 705. Otherwise, the EV system is operated in a normal mode as shown at block 703.

When the EV system is operated in the fault-tolerate mode, at least one of the battery 101, ultra-capacitor 103, IM 115, and IPM 117 fails. The normal parts may be reconfigured as a simplified electric drive system.

In some embodiments, one of the battery 101 and ultra-capacitor 103 with both of the IM 115 and IPM 117 are reconfigured. In some embodiments, both of the battery 101 and ultra-capacitor 103 with one of the IM 115 and IPM 117 are reconfigured. In some embodiments, one of the battery 101 and ultra-capacitor 103 with one of the IM 115 and IPM 117 are reconfigured. Therefore, the EV system may be allowed to stop in a safe way in the fault-tolerate mode with a fault-tolerant capability and reliability.

When the EV system is operated in the normal mode, after receiving a vehicle speed $V_{speed}$ 707 and calculating $P_{req}$ with $V_{speed}$ and $T_{total}$ 709, the process goes to four branches 702, 704, 706, and 708. The four branches will determine the operating AC motor and the operating manner. Index {1} is used to indicate that the IM 115 is enabled, index {2} is used to indicate that the IPM 117 is enabled, and index (1, 2) is used to indicate that both of the IM 115 and IPM 117 are enabled.

At branch 702, the EV system is operated in a starting mode 711 when $V_{speed}$ increases from about 0. In the starting mode, a determination is made to ascertain whether the IPM 117 can meet $P_{req}$ 719, if yes, the process goes to block 723, in which the IPM 117 is enabled as a motor for providing necessary mechanical torque to meet $P_{req}$. If not the process goes to block 725, in which the IM 115 is enabled as a motor is enabled as a motor for providing necessary mechanical torque to meet $P_{req}$.

At branch 704, the EV system is operated in an accelerating or uphill mode 713 when $V_{speed}$ changes with a sudden increase over a period of time. In the accelerating or uphill mode, the process goes to block 727, in which the IM 115 and IPM 117 are enabled as a motors for providing necessary mechanical torques to meet $P_{req}$.

At branch 706, the EV system is operated in a cruising mode 715 when $V_{speed}$ fluctuates within a scope of a small range. In the cruising mode, the process goes to block 729, in which at least one of the IM 115 and IPM 117 is enabled as a motor for providing necessary mechanical torque to meet $P_{req}$.

At branch 708, the EV system is operated in a regenerative or braking mode 717 when $V_{speed}$ changes with a sudden decrease over a period of time. In the regenerative or braking mode, the process goes to block 731, in which both of the IM 115 and IPM 117 are enabled as generators.

Figure 8:
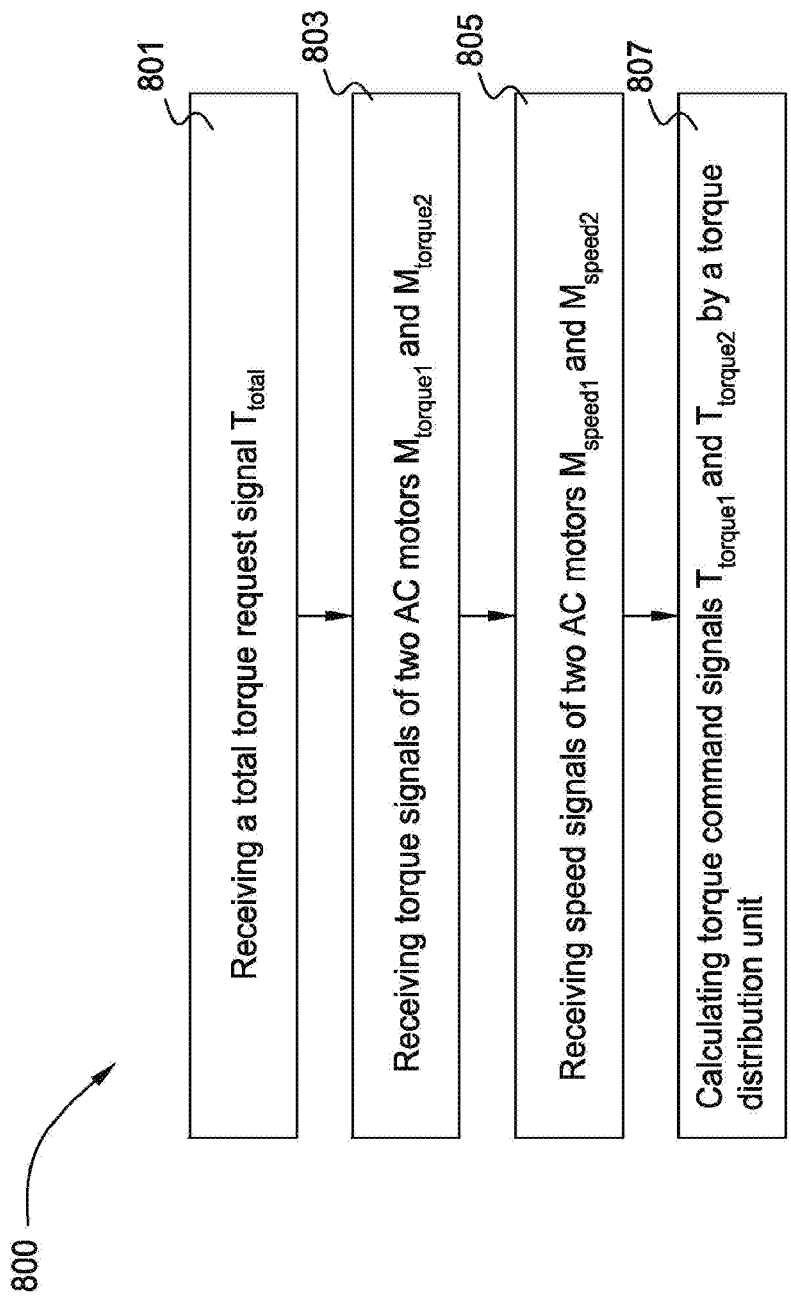
FIG. 8 is a flowchart of calculating two torque control signals through a torque distribution unit shown in FIG. 6 in accordance with an exemplary embodiment of the present disclosure.

FIG. 8 illustrates a flowchart of calculating two torque control signals through a torque distribution unit shown in FIG. 6 in accordance with an exemplary embodiment of the present disclosure. At block 801, at least one signal such as $T_{total}$ is received. At block 803, a first AC motor torque signal referred to as "$M_{torque1}$" and a second AC motor torque signal referred to as "$M_{torque2}$" are received. At block 805, a first AC motor speed signal referred to as "$M_{speed1}$" and a second AC motor speed signal referred to as "$M_{speed2}$" are received.

At block 807, a first torque command signal referred to herein as "$T_{torque1}$" and a second torque command signal referred to herein as "$T_{torque2}$" are calculated through a torque distribution unit. The torque distribution unit may be embodied as software which may be implemented by the EMS 17 described above. In some embodiments, $T_{total}$ may be provided by either the first AC motor (e.g., IM 115) or the second AC motor (e.g., IPM 117) or both the first and second AC motors with an appropriate torque distribution algorithm.

Figure 9:
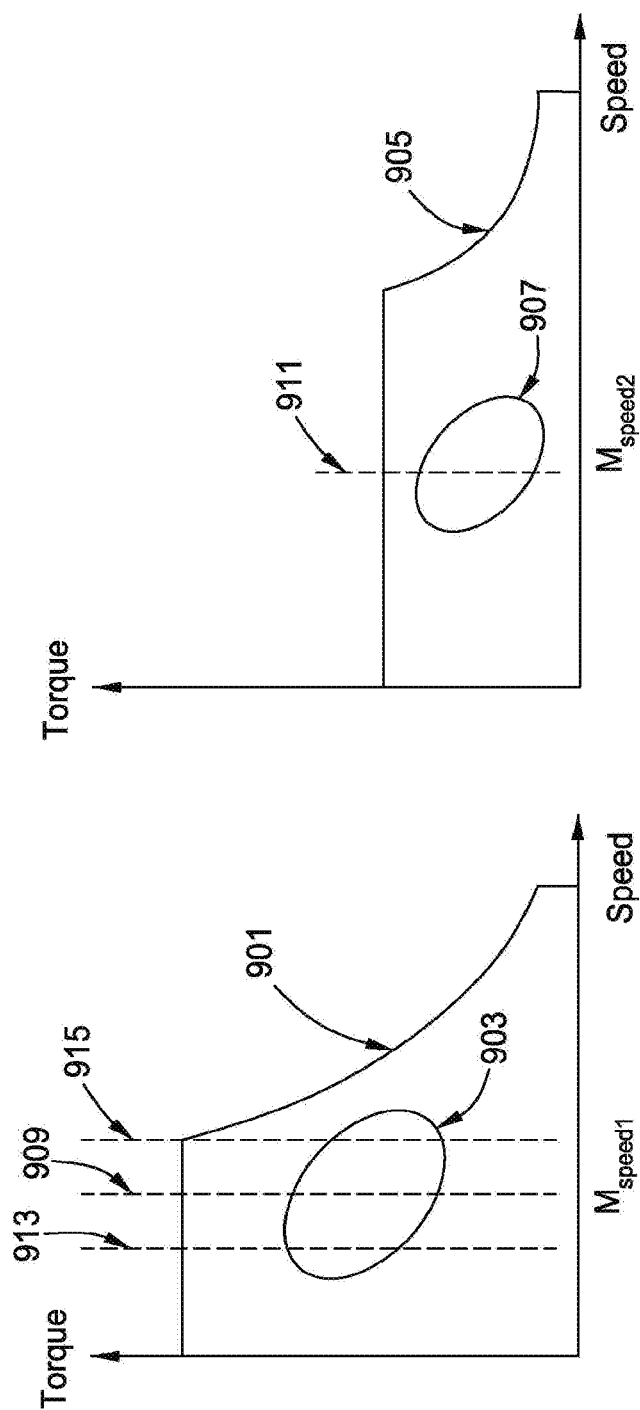
FIG. 9 is a graph of torque-speed waveforms of AC traction system used in FIG. 8 in accordance with an exemplary embodiment of the present disclosure.

In some embodiments, $T_{torque1}$ and $T_{torque2}$ may be calculated through a fixed proportion algorithm which is based at least in part on torque providing capability of the first and second AC motors as shown in FIG. 9. Waveforms 901 and 905 show the torque providing capability of the first and second AC motors (e.g., IM 115 and IPM 117). In an embodiment, one of the first and second AC motors can meet the requirement of $T_{total}$, if not, the other AC motor will work to provide an additional torque according to the following equations:

$$a\ T_{torque1} = T_{total} (0 \le a \le 1) \quad (1),$$

$$b\ T_{torque2} = T_{total} (0 \le b \le 1) \quad (2),$$

$$a + b = 1 \quad (3).$$

Where a and b are two variables, in some embodiments, a and b may include a group of fixed values. When a=0, b=1, the first AC motor 115 itself provides $T_{total}$, when a=1, b=0, the second AC motor 117 itself provides $T_{total}$. In some embodiments, a and b may include several groups of fixed values, so that an optimal torque distribution method can be implemented.

In some embodiments, $T_{total}$ may be distributed to an average torque referred herein as "$T_{average}$" and a peak torque referred herein as "$T_{peak}$". $T_{torque1}$ and $T_{torque2}$ are equal to $T_{average}$ and $T_{peak}$ respectively. For example, a peak torque is needed, in particular, with a sudden acceleration. In an embodiment, one of the first and second AC motors can provide the peak torque in a quick and stable response.

As shown in FIG. 9, the first AC motor can provide a large torque within a narrow speed range and the second AC motor can provide a smaller torque with a quick response within a wide speed range. In some embodiments, the second AC motor is used as an assistant which can work on and off. Basically, the algorithm is according to the following equations:

$$T_{total} = T_{average} + T_{peak} \quad (4),$$

$$T_{torque1} = T_{average} \quad (5),$$

$$T_{torque2} = T_{peak} \quad (6).$$

In some embodiments, $T_{torque1}$ and $T_{torque2}$ may be calculated through an algorithm of maximizing the system efficiency according to the high efficiency areas 903, 907 of the first and second AC motors shown in FIG. 9. In an embodiment, both the first and second AC motors can work in their own high efficiency areas by using the second AC motor to assist the first AC motor. In some embodiments, the transmission device 21 is used to change the operating point which can be implemented by changing $M_{speed1}$ (e.g., waveforms 913, 915).

In some embodiments, when $M_{speed1}$ and $M_{speed2}$ are fixed values, the operating points of the first and second AC motors may move along with waveforms 909, 911 within the scope of the high efficiency areas 903, 907. Thereby the total loss can be minimized. The algorithm may be determined according to the following equations:

$$T_{torque1} + T_{torque2} = T_{total} \quad (7),$$

$$P_{loss1} + P_{loss2} = \min \quad (8).$$

Where $P_{loss1}$ and $P_{loss2}$ are power loss of the first and second AC motors respectively. This method functions through checking a look up table defining high efficiency areas of the two AC motors according to efficiency maps of each AC motor in the first AC drive device 20 and the second AC drive device 22 for reducing the total loss based at least in part on the motor speeds $M_{speed1}$ and $M_{speed2}$.

Figure 10:
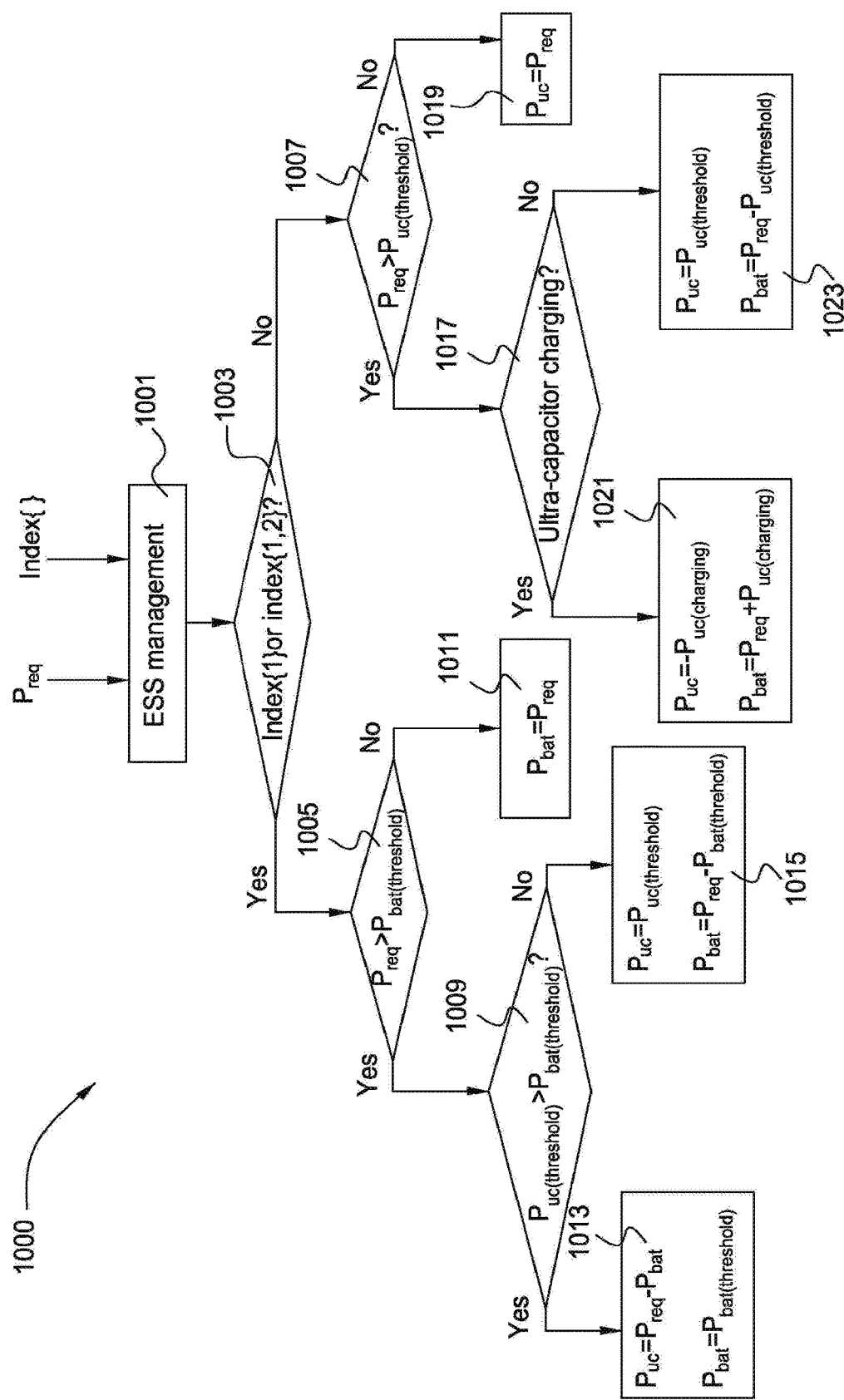
FIG. 10 is a flowchart of enabling at least one of the first energy storage unit and the second energy storage unit shown in FIG. 6 in accordance with an exemplary embodiment of the present disclosure.

FIG. 10 illustrates a flowchart of enabling at least one of the first energy storage unit and the second energy storage unit is enabled shown in FIG. 6 in accordance with an exemplary embodiment of the present disclosure. $P_{req}$ is used to represent a required power, $P_{bat}$ is used to represent a power provided by the battery 101, $P_{uc}$ is used to represent a power provided by the ultra-capacitor 103, $P_{bat(threshold)}$ is used to represent an upper limit power provided by the battery 101, $P_{uc(threshold)}$ is used to represent an upper limit power provided by the ultra-capacitor 103, and $P_{uc(charging)}$ is used to represent a required charging power of the ultra-capacitor 103.

At block 1001, $P_{req}$ and motor index are received. Then process goes to block 1003, a determination is made to ascertain which branch the process will go. The process goes to block 1005 when receiving index {1} or index {1, 2}. Otherwise, the process goes to block 1007 when receiving index {2}.

At block 1005, if $P_{req}$ is larger than $P_{bar}$, the process goes to block 1009. Otherwise, the process goes to block 1011 in which the battery 101 provides the power. At block 1009, if $P_{uc(threshold)}$ is larger than an additional power $P_{req}-P_{bat(threshold)}$, the process goes to block 1013 that the battery 101 provides the upper limit power itself and the ultra-capacitor 103 provides the additional power.

At block 1007, if $P_{req}$ is larger than $P_{uc(threshold)}$, the process goes to block 1017. Otherwise, the process goes to block 1019 that the ultra-capacitor 103 provides the power. At block 1017, if the ultra-capacitor 103 requires to be charged, the process goes to 1021 that the ultra-capacitor 103 receives the required charging power $P_{uc(charging)}$, and the battery 101 provides both the required power $P_{req}$ and the required charging power of the ultra-capacitor 103 $P_{uc(charting)}$. Otherwise, the process goes to block 1023 that the ultra-capacitor 103 provides the upper limit power itself and the battery provides the additional power.

As will be understood by those familiar with the art, the present invention may be embodied in other specific forms without depending from the spirit or essential characteristics thereof. Accordingly, the disclosures and descriptions herein are intended to be illustrative, but not limiting, of the scope of the invention which is set forth in the following claims.

The invention claimed is:

1. A drive system for a vehicle, comprising:
   an energy storage system (ESS);
   a first electric motor coupled to the ESS;
   a second electric motor coupled to the ESS;
   a transmission device coupled to the first electric motor;
   a power split device coupled to the transmission device and the second electric motor; and
   an energy management system (EMS) configured to:
      enable only the first electric motor of the first and second electric motors to operate as a motor to drive the vehicle in a first mode of operation when the vehicle is cruising; and
      enable the first electric motor and second electric motor to operate as motors to drive the vehicle in a second mode of operation when the vehicle is accelerating.

2. The drive system of claim 1, further comprising a power conversion device coupled to the ESS and the first and second electric motors.

3. The drive system of claim 1, wherein the ESS comprises a first energy storage unit and a second energy storage unit.

4. The drive system of claim 3, wherein the first energy storage unit comprises a battery and the second energy storage unit comprises an ultra-capacitor.

5. The drive system of claim 1, further comprising a first inverter coupled between the ESS and the first electric motor and a second inverter coupled between the ESS and the second electric motor.

6. The drive system of claim 1, further comprising a pre-charging switching device.

7. The drive system of claim 1, wherein the EMS is further configured to enable the second electric motor to operate as a generator in the first mode of operation when the vehicle is cruising.

8. An electric drive system for a vehicle, comprising:
   an energy storage system (ESS);
   a first inverter coupled to the ESS;
   a first AC motor coupled to the first inverter;
   a second inverter coupled to the ESS;
   a second AC motor coupled to the second inverter;
   a transmission device coupled to the first AC motor;
   a power split device coupled to the transmission device and the second AC motor; and
   an energy management system (EMS) configured to selectively:
      enable only the first AC motor of the first and second AC motors to operate as a motor to drive the vehicle when the vehicle is cruising; and
      enable the first AC motor and second AC motor to operate as motors to drive the vehicle when the vehicle is accelerating.

9. The electric drive system of claim 8, further comprising a power conversion device coupled to the ESS and the first and second inverters.

10. The electric drive system of claim 8, wherein the ESS comprises a first energy storage unit and a second energy storage unit.

11. The drive system of claim 10, wherein the first energy storage unit comprises a battery and the second energy storage unit comprises an ultra-capacitor.

12. The electric drive system of claim 8, further comprising a pre-charging switching device.

13. The electric drive system of claim 8, wherein the EMS is further configured to enable the second AC motor to operate as a generator when the vehicle is cruising.

14. A drive system for a vehicle, comprising:
   an energy storage system (ESS);
   a first electric motor coupled to the ESS;
   a second electric motor coupled to the ESS;
   a transmission device coupled to the first electric motor;
   a power split device coupled to the transmission device and the second electric motor; and
   an energy management system (EMS) configured to:
      enable only the first electric motor of the first and second electric motors to operate as a motor to drive the vehicle in a first mode of operation when the vehicle is cruising; and
      enable the first electric motor and second electric motor to operate as motors to drive the vehicle in a second mode of operation when the vehicle is in an uphill mode.

15. The drive system of claim 14, further comprising a power conversion device coupled to the ESS and the first and second electric motors.

16. The drive system of claim 14, wherein the ESS comprises a first energy storage unit and a second energy storage unit.

17. The drive system of claim 16, wherein the first energy storage unit comprises a battery and the second energy storage unit comprises an ultra-capacitor.

18. The drive system of claim 14, further comprising a first inverter coupled between the ESS and the first electric motor and a second inverter coupled between the ESS and the second electric motor.

19. The drive system of claim 14, further comprising a pre-charging switching device.

20. The drive system of claim 14, wherein the EMS is further configured to enable the second electric motor to operate as a generator in the first mode of operation when the vehicle is cruising.

\* \* \* \* \*